(12) United States Patent
Tseng et al.

(10) Patent No.: US 9,372,812 B2
(45) Date of Patent: Jun. 21, 2016

(54) DETERMINING POLICY ACTIONS FOR THE HANDLING OF DATA READ/WRITE EXTENDED PAGE TABLE VIOLATIONS

(75) Inventors: Kuo-Lang Tseng, Cupertino, CA (US); Baohong Liu, Cupertino, CA (US); Ritu Sood, Milpitas, CA (US); Manohar Ruben Castelino, Sunnyvale, CA (US); Madhukar Tallam, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 13/995,131

(22) PCT Filed: Dec. 22, 2011

(86) PCT No.: PCT/US2011/067038
§ 371 (c)(1),
(2), (4) Date: Jun. 17, 2013

(87) PCT Pub. No.: WO2013/095577
PCT Pub. Date: Jun. 27, 2013

(65) Prior Publication Data
US 2014/0201422 A1 Jul. 17, 2014

(51) Int. Cl.
| | | |
|---|---|---|
| *G06F 13/00* | (2006.01) | |
| *G06F 13/28* | (2006.01) | |
| *G06F 12/14* | (2006.01) | |
| *G06F 9/455* | (2006.01) | |
| *G06F 12/02* | (2006.01) | |

(52) U.S. Cl.
CPC ........ *G06F 12/1441* (2013.01); *G06F 9/45558* (2013.01); *G06F 12/0292* (2013.01); *G06F 12/1458* (2013.01); *G06F 2009/45587* (2013.01)

(58) Field of Classification Search
CPC .................................................. G06F 12/1441
See application file for complete search history.

(56) References Cited

U.S. PATENT DOCUMENTS

| | | | |
|---|---|---|---|
| 2005/0102671 A1* | 5/2005 | Baumberger | 718/1 |
| 2005/0200504 A1* | 9/2005 | Timmermans et al. | 341/50 |
| 2008/0120487 A1 | 5/2008 | Saripalli | |

(Continued)

FOREIGN PATENT DOCUMENTS

| | | |
|---|---|---|
| TW | 200951980 A | 12/2009 |
| TW | 201040781 A | 11/2010 |

OTHER PUBLICATIONS

PCT "Notification of Transmittal of the International Search Report and the Written Opinion of the International Searching Authority, or the Declaration", Application No. PCT/US2011/067038 mailed Jul. 30, 2012, 10 pages.

(Continued)

*Primary Examiner* — Eric S Cardwell
(74) *Attorney, Agent, or Firm* — Nicholson De Vos Webster & Elliott LLP

(57) ABSTRACT

Embodiments of systems, apparatuses, and methods for determining if an instruction of a virtual machine is allowed to modify a protected memory region are described. In some embodiments, a system detects an indication of an attempt by the instruction to write to the protected memory region. In addition, the system determines if the instruction is allowed to write to the protected memory region based on a starting address and data length of the instruction. Furthermore, if the instruction is allowed to write to the protected memory region, the system updates the protected memory region with the instruction results.

16 Claims, 15 Drawing Sheets

(56) References Cited

U.S. PATENT DOCUMENTS

| | | |
|---|---|---|
| 2010/0332813 A1 | 12/2010 | Rothman et al. |
| 2010/0333090 A1 | 12/2010 | Wright |
| 2011/0134479 A1 | 6/2011 | Refstrup |
| 2013/0007325 A1* | 1/2013 | Sahita et al. .......... 710/267 |

OTHER PUBLICATIONS

Notice of Allowance from Taiwan Patent Application No. 101143446, mailed Sep. 30, 2015, 2 pages.

Office action and Search Report from Taiwan Patent Application No. 101143446, mailed Feb. 24, 2015, 4 pages.

* cited by examiner

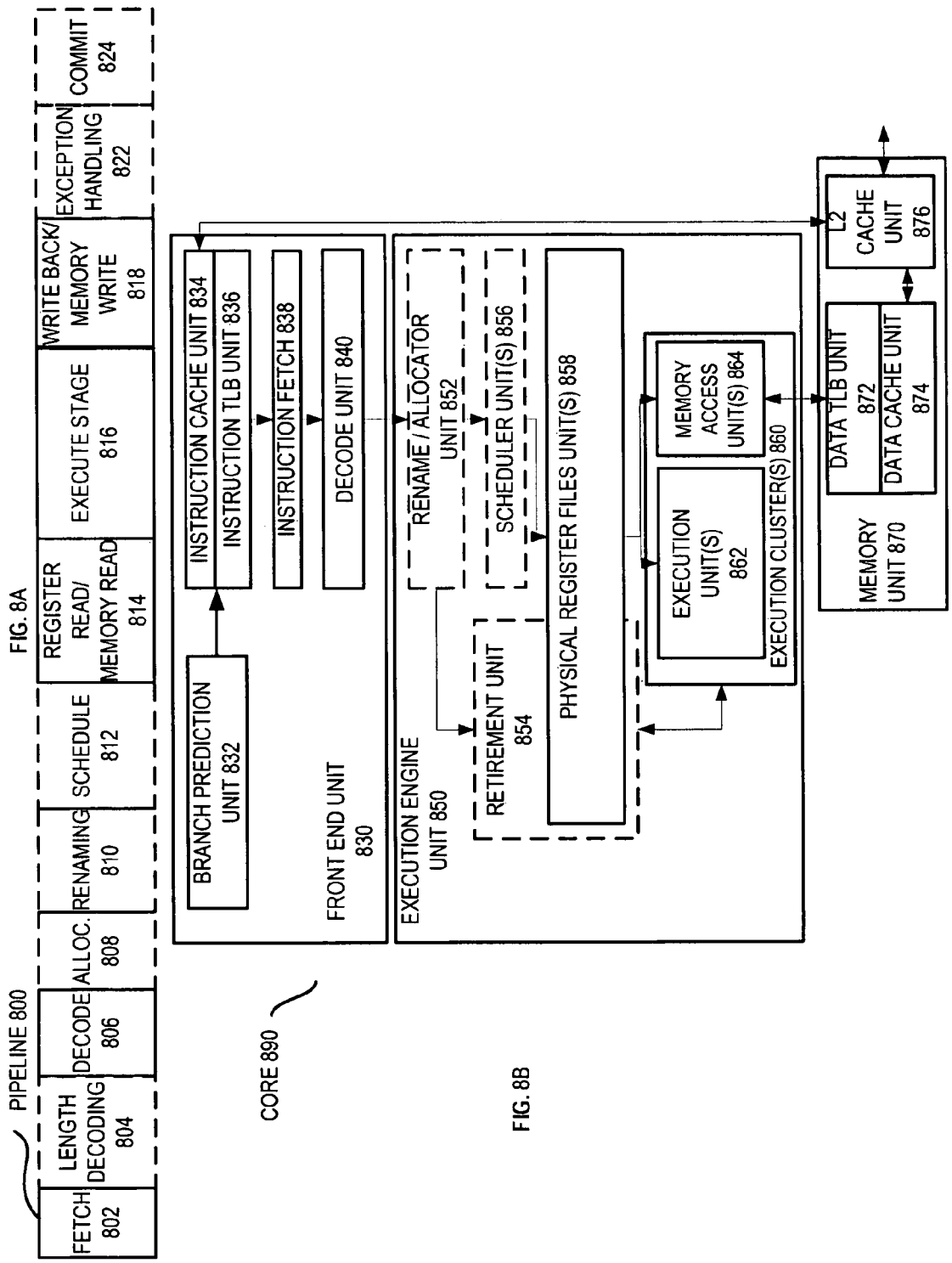

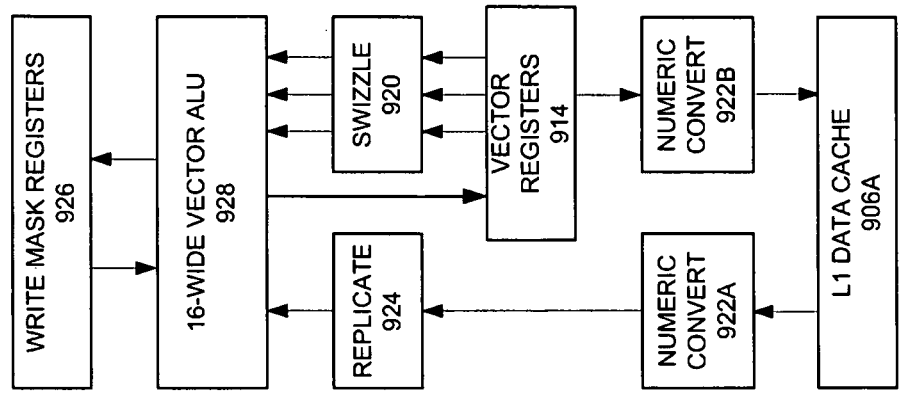
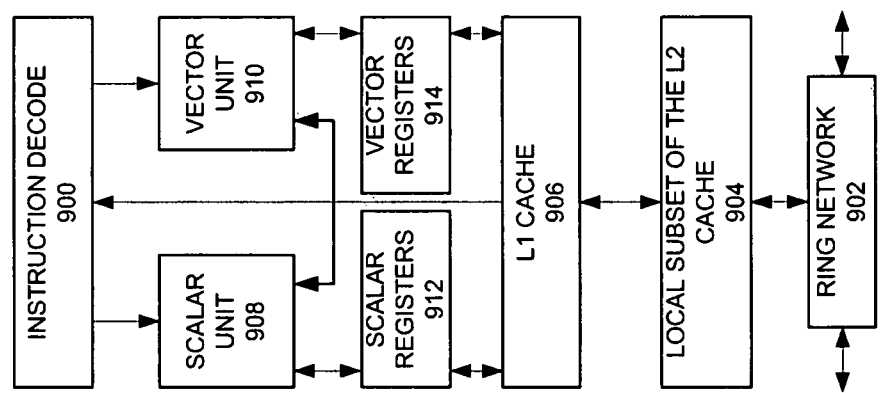

DETERMINING POLICY ACTIONS FOR THE HANDLING OF DATA READ/WRITE EXTENDED PAGE TABLE VIOLATIONS

CROSS-REFERENCE TO RELATED APPLICATIONS

This patent application is a U.S. National Phase Application under 35 U.S.C. §371 of International Application No. PCT/US2011/067038, filed Dec 22, 2011, entitled DETERMINING POLICY ACTIONS FOR THE HANDLING OF DATA READ/WRITE EXTENDED PAGE TABLE VIOLATIONS.

FIELD OF INVENTION

The field of invention relates generally to computer memory architecture, and, more specifically, to handling read/write extended page table violations.

BACKGROUND

Hardware-assisted virtualization is a way of improving the efficiency of virtualizing a guest platform on a host device. This involves employing specially designed central processing units (CPUs) and hardware components that help improve the performance of a guest platform environment. Virtualization consists of two principal classes of software, which are the VMM (Virtual-Machine Monitor) and the guest software. The VMM acts as a host and has control of physical processors and other platform hardware. The VMM presents the guest software with an abstraction of a virtual processor and allows it to execute directly on a logical processor. In addition, the VMM is able to retain selective control of processor resources and other hardware. The Virtual Machine (VM) is a guest software environment that runs independently with reduced privilege, so that the VMM can retain control of the platform.

One problem in the control of a VM by a VMM is that an instruction of a processor running in the guest VM may attempt to modify protected or privileged data of the VM, where the protected or privileged data are stored in read-only memory. To determine if this instruction has access to the range of data the instruction wishes to modify, the VMM would need to fetch and decode that instruction, which is a costly process for the VMM.

BRIEF DESCRIPTION OF THE DRAWINGS

The present invention is illustrated by way of example and not limitation in the figures of the accompanying drawings, in which like references indicate similar elements and in which:

FIG. 8A is a block diagram illustrating an exemplary in-order pipeline and an exemplary register renaming, out-of-order issue/execution pipeline according to embodiments of the invention.

FIG. 8B is a block diagram illustrating an exemplary embodiment of an in-order architecture core and an exemplary register renaming, out-of-order issue/execution architecture core to be included in a processor according to embodiments of the invention.

FIGS. 9A and 9B are block diagrams illustrating an exemplary in-order core architectures according to embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Read/Write (RW) Extended Page Table (EPT) Violations

Below are embodiments of determining if a read/write (RW) extended page table (EPT) violation is allowed using a data length in a virtualized environment. In one embodiment, the system detects an RW EPT violation at a starting address from an instruction during a VMEXIT. The system determines if the instruction is allowed access to the starting address, and if so, the system retrieves an instruction data length. Using the data length and the starting address range, the system determines if the instruction has access to the data range indicated by the starting address and the data length. If the instruction is allowed access to the data range, the system updates the EPT and resumes the VM. If not, the system takes alternate action.

Figure 1:
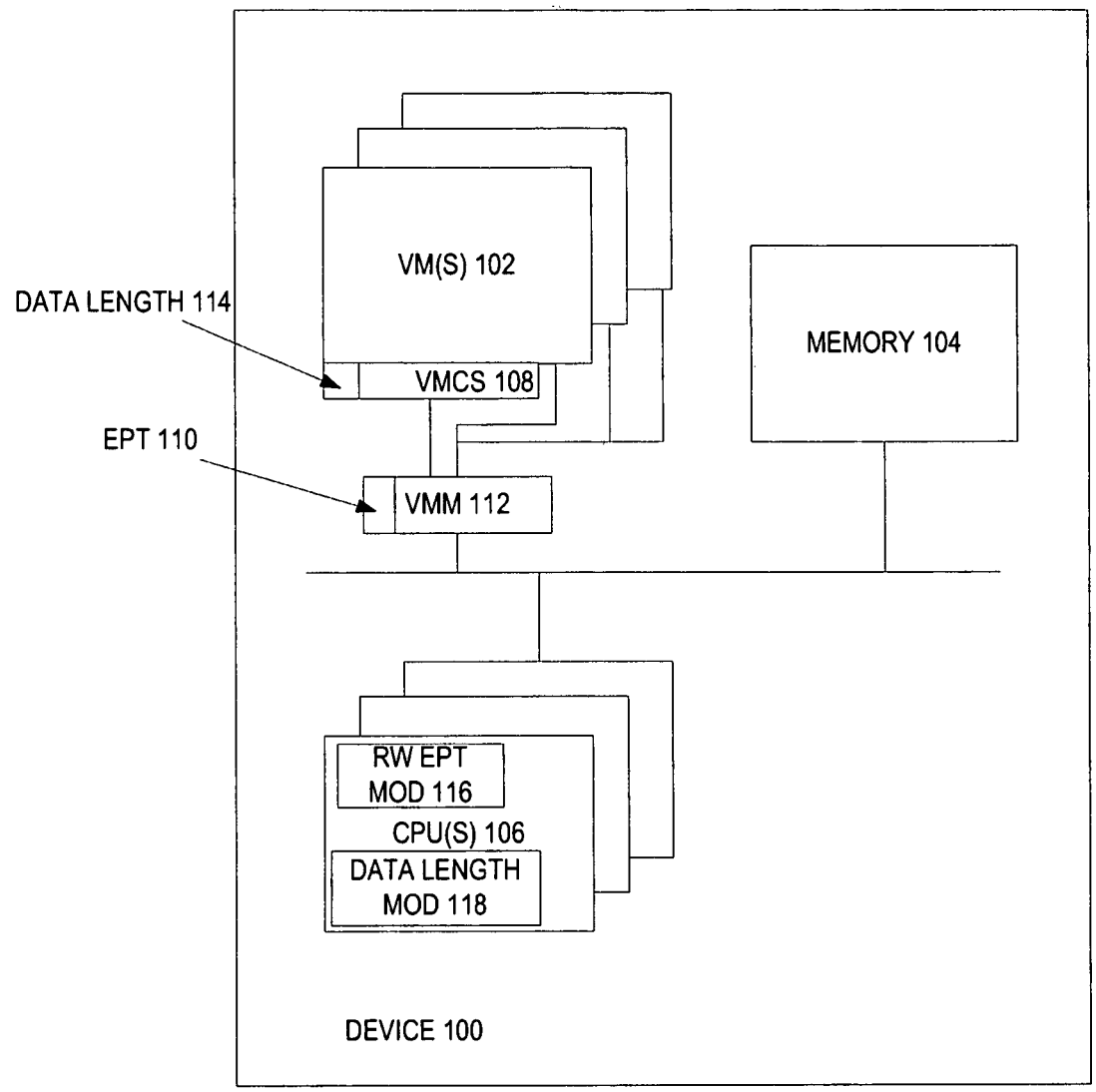
FIG. 1 illustrates a block diagram of a device with multiple virtual machines according to one embodiment of the invention.

FIG. 1 illustrates a block diagram of a device 100 with multiple virtual machines 102 according to one embodiment of the invention. In FIG. 1, the device 100 includes one or more virtual machines (VM) 102, memory 104, and one or more central processing units (CPUs) 106. In one embodiment, the device can be a type of device that is capable running one or more virtual machines (personal computer, laptop, server, embedded device, etc. and/or any other type of device capable of running one or more virtual machines). In one embodiment, each of the CPUs 106 is a CPU that can be a single core or a multicore processor. In one embodiment, memory 104 is physical memory.

In one embodiment, device 100 includes one or more VMs 102 executing on the device 100. In this embodiment, a virtual machine monitor (VMM) 112 manages each VM 102. In addition, each VM 102 has an associated virtual machine control structure (VMCS) 108. In one embodiment, a VM is a software implementation of a machine (e.g. a computer) that executes programs like a physical machine. In one embodiment, a virtual machine provides a system platform, which supports the execution of an operating system (OS). If there are more than one VM, each of the VMs may run the same or different OS and this OS may be the same or different from the OS running in device 100. For example and in one embodiment, the computer may run Microsoft Windows™, whereas the VMs 102 may run the same or different OS (e.g. the same or different version of Microsoft Windows™, Apple Mac OS X™, UNIX-based OS, etc.).

Because each of the VM(s) 102 are a separate machine running within device 100, each of the VM(s) 102 is associated with a virtual machine manager (VMM) 112 that is used to manage the VM 102 on the host device 100. The VMM 112 for each VM 102 presents to the guest OS of the VM 102 a virtual operating platform and manages the execution of the guest OS. In addition, the VMM 112 manages the memory translation between the guest physical memory address space of the corresponding VM 102 to system physical memory address space of the memory 104. In one embodiment, an extended page table (EPT) 110 for that VM 102 can be used to perform the translation process from the guest physical memory address to the system physical address. In this embodiment, the EPT 110 is used by the VMM to perform the translation. Thus, the EPT 110 that can be used to support the virtualization of physical memory.

When an EPT 110 is in use, addresses that would normally be treated as physical addresses are instead treated as guest physical addresses. Guest physical addresses are translated by traversing a set of EPT paging structures to produce physical addresses for accessing physical memory. In one embodiment, the EPT 110 specifies the page permission (XWR) for each memory page for software running from the guest. In this embodiment, attempts to perform disallowed access to memory result in EPT violations (e.g., VMEXITs). In a VMEXIT, the VMM 112 can examine the guest context, for example, a guest instruction pointer (e.g., a 32 bit, 64 bit, etc. instruction pointer), and make the decisions about the instruction, which can be denying, allowing or other actions. If the VMM decides to allow the access, it can switch to a different EPT view (e.g., EPT table), which has the permission for the concerned page, or update the current EPT page entry to allow the access. In this embodiment, the granularity of the memory permission is on a per page basis, (e.g., four kilobytes, etc.).

Figure 2:
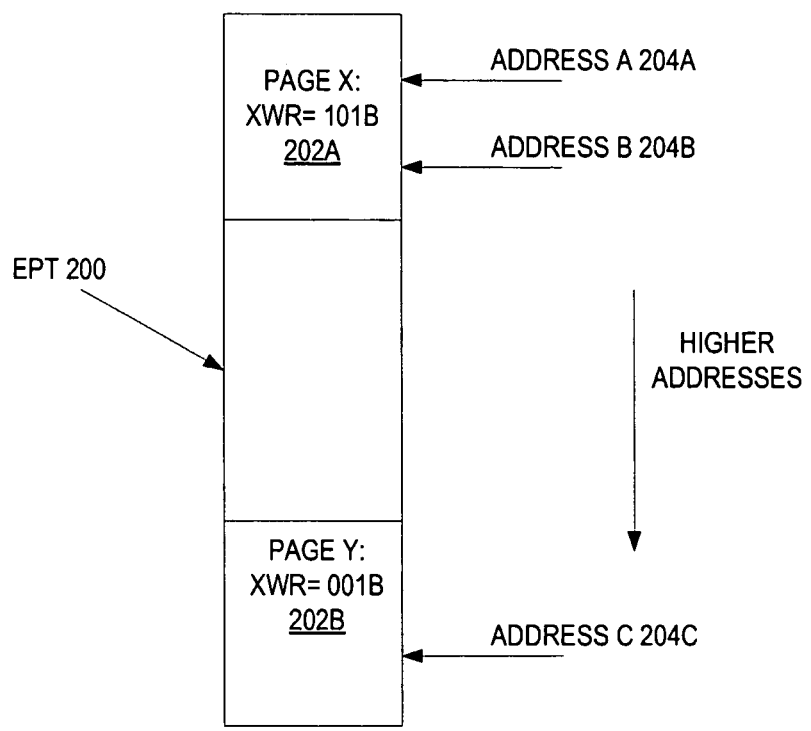
FIG. 2 illustrates is a block diagram of a read/write (RW) extended page table (EPT) violation according to one embodiment of the invention.

FIG. 2 illustrates an embodiment of a block diagram of a read/write (RW) extended page table (EPT) violation. In FIG. 2, a page table 200 includes page X 202A and page Y 202B. In one embodiment, a page is a page of memory and can be of different sizes (e.g., 4 KB, etc.). As illustrated in FIG. 2, addresses A 204A and B 204B refer to addresses that are included in page X 202A In addition, address C refers to an address that is included in page Y 202B. In one embodiment, the EPT 200 serves the purpose of monitoring memory on a page basis. For example and in one embodiment, in FIG. 2, page X 202A has execute and read permissions, whereas page Y 202B has read-only permission in the EPT table 200. In this embodiment, the read-only permission is used to protect the data in page Y from an un-expected write.

In one embodiment, if an instruction at address A 204A in page X 202A accesses data at address C 204C in page Y 202B that has only read permissions in the EPT, an EPT violation results and a VMEXIT. In a VMEXIT, the VMM can decide whether to allow the access based on guest instruction pointer and/or other VMCS fields. If the access is allowed, the VMM can temporarily modify permission for page Y 202B to allow the access or the VMM can decide to switch to a different EPT view (e.g., EPT table), which has the needed permission for page Y 202B. Alternatively, the VMM can reject the access or take other actions. By this mechanism, the EPT is able to make sure the protected data can be modified by trusted code.

Figure 3:
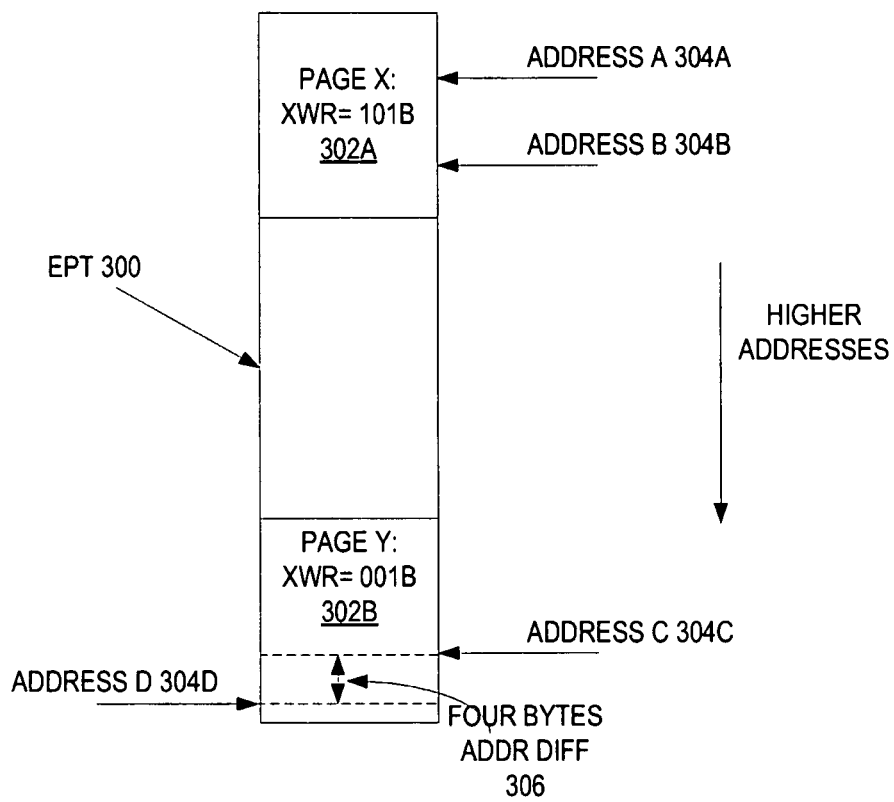
FIG. 3 illustrates a block diagram of a RW EPT violation with an overwrite in a page table onto another address according to one embodiment of the invention.

FIG. 3 illustrates a block diagram of a RW EPT violation in a page table 300 with an overwrite onto another address according to one embodiment of the invention. In FIG. 3, a page table 300 includes page X 302A and page Y 302B. In one embodiment, a page is a page of memory and can be of different sizes (e.g., 4 KB, etc.). As illustrated in FIG. 3, addresses A 304A and B 304B refer to address that are included in page X 302A In addition, addresses C 302C and D 302D refers to an address that is included in page Y 302B. In one embodiment, the difference between address C 302C and address D 302D is four bytes.

Unlike in FIG. 2, in FIG. 3, the memory protection is on a smaller granularity basis (e.g., parts of page Y 302B are protected and parts are not). In one embodiment, the VMM monitors the data accesses at and above address D 304D in page Y 302B and does not monitor accesses to data below address D 304D in page Y 302B. If an instruction at address B 304B in page X 302B tries to write some data to address C 304C in page Y 302B, the VMM allows the access by updating the EPT page permission, since the VMM is not monitoring the data at address C 304C. However, in one embodiment, malicious code can try to write to address D 304D in page Y 302B by writing more than four bytes from address C 304C and overwriting the data at address 304D. In one embodiment, to prevent this from happening and before granting the access, the VMM fetches and decodes the instruction at address B 302B to find out the data length to be written, which can be costly. In this embodiment, for most of the data accesses, the VMM cannot decide the range of data being written starting at address D 304D without fetching and decoding the instruction.

In one embodiment, to enable the VMM to determine the data range of the data being written without the potential penalty of fetching and decoding the instruction, the VMM populates the data length into VMCS in the EPT upon a RW violation VMEXIT. In the VMEXIT, the VMM uses the combination of the data length and the starting address (which is available in VMCS) to determine if the instruction causing the EPT violation is allowed access to the data range. Furthermore, in this embodiment, the VMM runs more efficiently because the VMM does not need to decode the instruction to determine the data length of the instruction. Using the data length to determine instruction access and to store the data length in the VMCS is further described in FIGS. 4 and 5 below.

Figure 4:
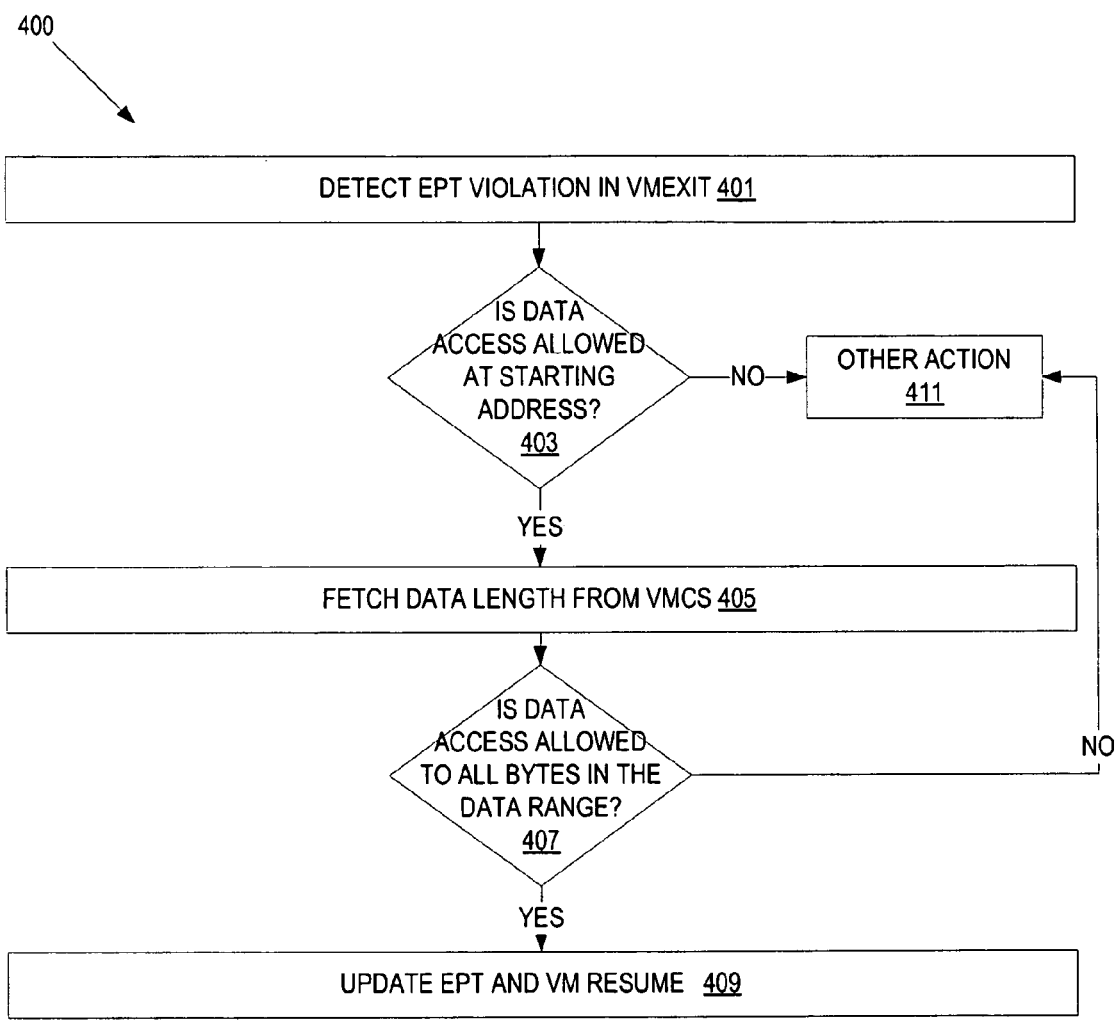
FIG. 4 illustrates an embodiment of method for determining if a RW EPT violation is allowed using a data length.

FIG. 4 illustrates an embodiment of method 400 for determining if a RW EPT violation is allowed using a data length. In one embodiment, method 400 is performed by RW EPT module 116 of the device 100 as described above in the FIG. 1. In FIG. 4, method 400 begins by detecting an EPT violation in a VMEXIT at block 401. In one embodiment, method 400 detects an EPT violation when an instruction attempts to write into a read-only page of an EPT. For example and in one embodiment, method 400 would detect an EPT violation that happened due to the instruction B at address 304B attempting to write in a read-only region of page Y 302B at address C 304C as described in FIG. 3 above.

At block 403, method 400 determines if the data access is allowed for the instruction at the starting address requested by the instruction. In one embodiment, method 400 determines if the data access is allowable by retrieving the starting address associated with the EPT violation from the VMCS. For example and in one embodiment, method 400 can examine the guest context stored in VMCS for the instruction pointer corresponding to the instruction requesting the data access to determine whether to allow or deny this access. For example and in one embodiment, method 400 determines the instruction B wishes to write into the read-only region of page Y 302B at address C 304C. In this embodiment, address C 304C is the starting address of instruction B. If access is denied, method 400 takes other action at block 411. In one embodiment, method 400 can skip the corresponding instruction, dispatch some other code to correct the problem, etc.

If access is allowed, at block 405, method 400 fetches the data length from the VMCS. In one embodiment, the data length is the amount of data to be written to by the instruction that caused the RW EPT violation that was detected at block 401 above. In one embodiment, the data length is stored when the EPT violation is triggered by the VMM in the VMCS data length field. Storing the data length is further described in FIG. 5 below. At block 407, method 400 determines if the data access is allowed over the bytes in the data range. In one embodiment, the data range is the starting address determined at block 403 and the data length retrieved at block 405 above. If access is not allowed, method 400 takes other action at block 411. In one embodiment, method 400 can skip the corresponding instruction, dispatch some other code to correct the problem, etc.

If the access is allowed, method 400 updates the EPT and the VM resumes. In one embodiment, the EPT is updated with the results of the instruction. In one embodiment, method 400 changes the page access control to read/write and the instruction that triggered the EPT violation is allowed to modify the data at this starting address of the EPT and over the data range. The instruction finishes and method 400 resumes the VM. For example and in one embodiment, referring back to FIG. 3 above, method 400 executes instruction at address B 304B which modifies the data' starting at address C 304C and over the data range indicated by the data length of this instruction.

Figure 5:
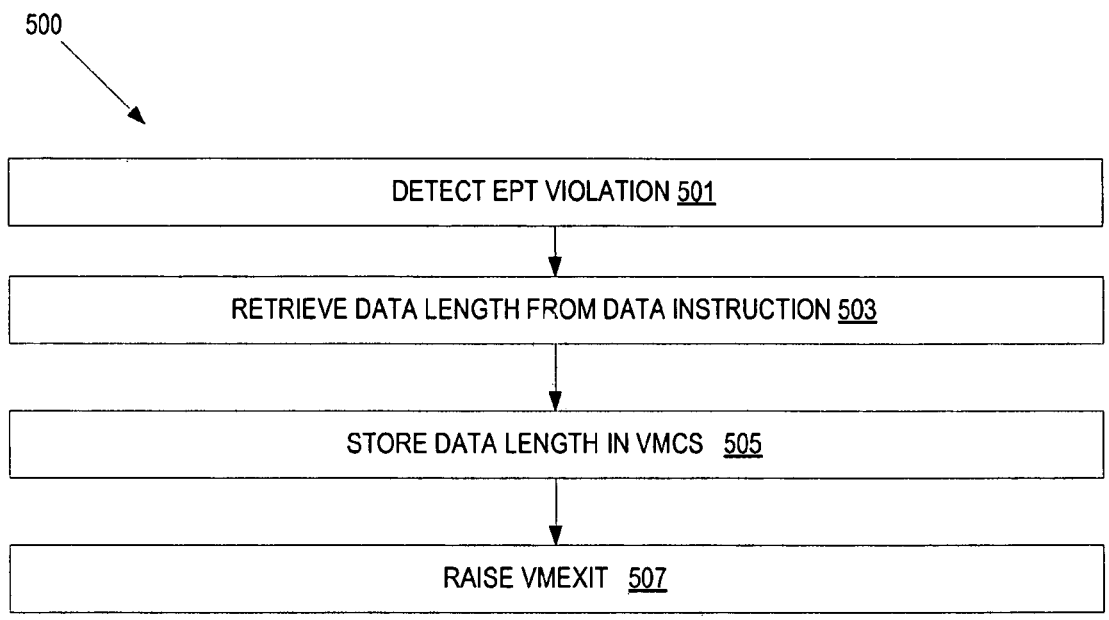
FIG. 5 illustrates an embodiment of a method for storing an instruction data length prior to a VMEXIT.

As described above, method 400 retrieves an instruction data length from the VMCS to determine if the instruction has access to the range of data. In order for the method 400 to proceed efficiently, the instruction data length is to be stored in the VMCS prior to method 400 executing. In one embodiment, the instruction data length is stored in the VMCS before the VMEXIT. FIG. 5 illustrates an embodiment of a method 500 for storing an instruction data length prior to a VMEXIT. In one embodiment, method 500 is performed by the data length module 118 as illustrated in FIG. 1 above. In FIG. 5, method 500 detects the EPT violation at block 501. In one embodiment, method 500 detects this violation by an instruction that is attempting to write to a page of an EPT that does not have write permission. For example and in one embodiment, method 500 determines that instruction B at address 304B is attempting to write at in a read-only region of page Y 302B at address C 304C as described in FIG. 3 above.

At block 503, method 500 retrieves the data length for the instruction. In one embodiment, the data length is length of data the instruction wishes to write at that starting address of the instruction. For example and in one embodiment, method 500 determines that instruction B at address 304B attempting to write a certain number of bytes in a read-only region of page Y 302B at address C 304C as described in FIG. 3 above. Method 500 stores the data length in the VMCS at block 505. In one embodiment, the data length is used by method 400 to determine if that instruction is allowed to access the data range as described in FIG. 4 above. At block 507, method 500 raises the VMEXIT.

Figure 6:
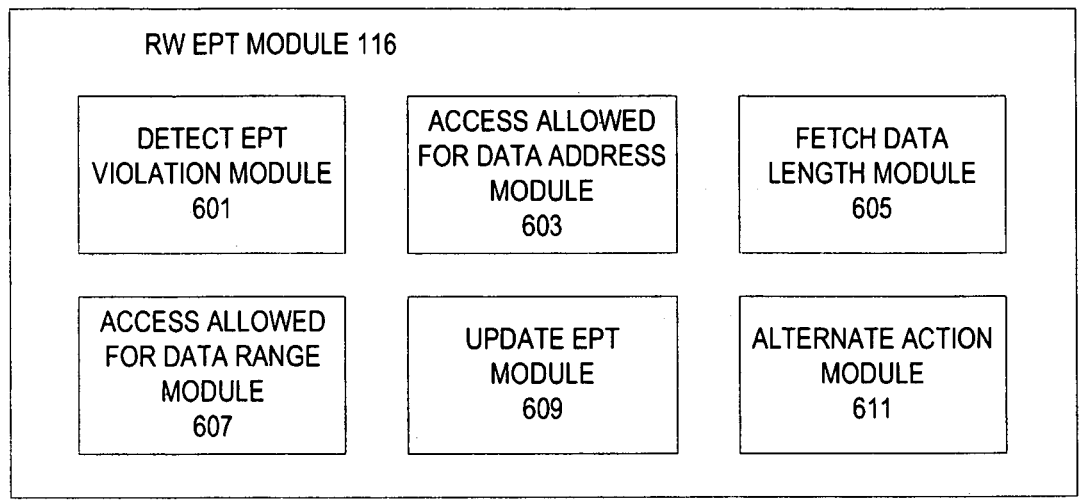
FIG. 6 illustrates a block diagram of a RW EPT module to determine if a RW EPT violation is allowed using a data length according to one embodiment of the invention.

FIG. 6 illustrates a block diagram of a RW EPT module 116 to determine if a RW EPT violation is allowed using a data length according to one embodiment of the invention. In one embodiment, RW EPT module 116 includes detect EPT violation module 601, access allowed for data address module 603, fetch data length module 605, access allowed for data range module 607, update EPT module 609, and alternate action module 611. In one embodiment, the detect EPT violation module 601 detects and receives the EPT violation in the VMEXIT as described above in FIG. 4, block 401. In one embodiment, the access allowed for data address module 603 determines if the instruction has access at the starting address as described above in FIG. 4, block 403. In one embodiment, the fetch data length module 605 fetches the instruction data length from the VMCS as described above in FIG. 4, block 405. In one embodiment, the access allowed for data range module 607 determines if the instruction has access to the data range as described above in FIG. 4, block 407. In one embodiment, the update EPT module 609 updates the EPT resumes the VM as described above in FIG. 4, block 409. In one embodiment, the alternate action module 611 takes alternate action as described above in FIG. 4, block 411.

Figure 7:
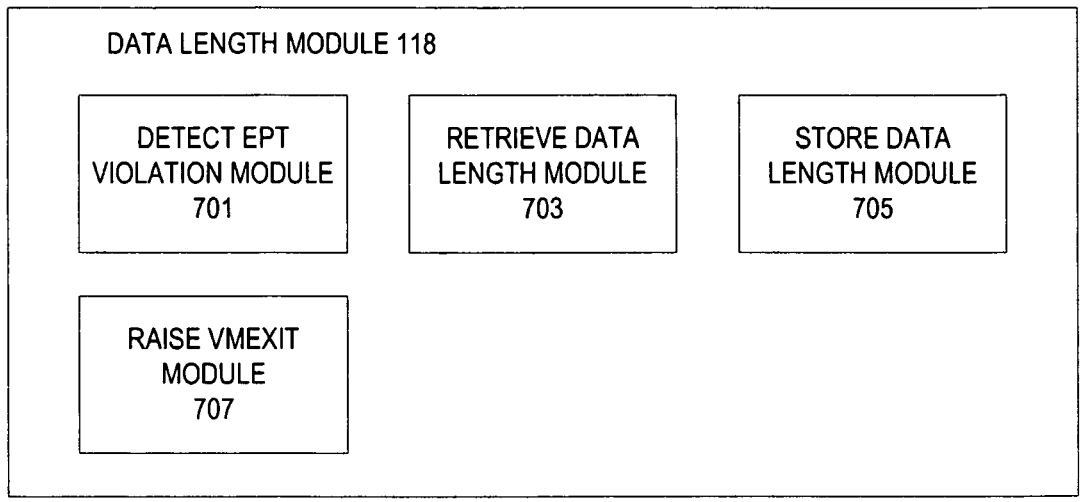
FIG. 7 illustrates a block diagram of a data length module to store an instruction data length prior to a VMEXIT according to one embodiment of the invention.

FIG. 7 illustrates a block diagram of a data length module 118 to store an instruction data length prior to a VMEXIT according to one embodiment of the invention. In one embodiment, the data length module 118 includes the detect EPT violation module 701, retrieve data length module 703, store data length module 705, and raise VMEXIT module 707. In one embodiment, the detect EPT violation module 701 detects the EPT violation as described above in FIG. 5, block 501. In one embodiment, the retrieve data length module 703 retrieves the instruction data length as described above in FIG. 5, block 503. In one embodiment, the store data length module 705 stores the instruction data length in the VMCS as described above in FIG. 5, block 505. In one embodiment, the raise VMEXIT module 707 raises the VMEXIT as described above in FIG. 5, block 507.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808; a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory,write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
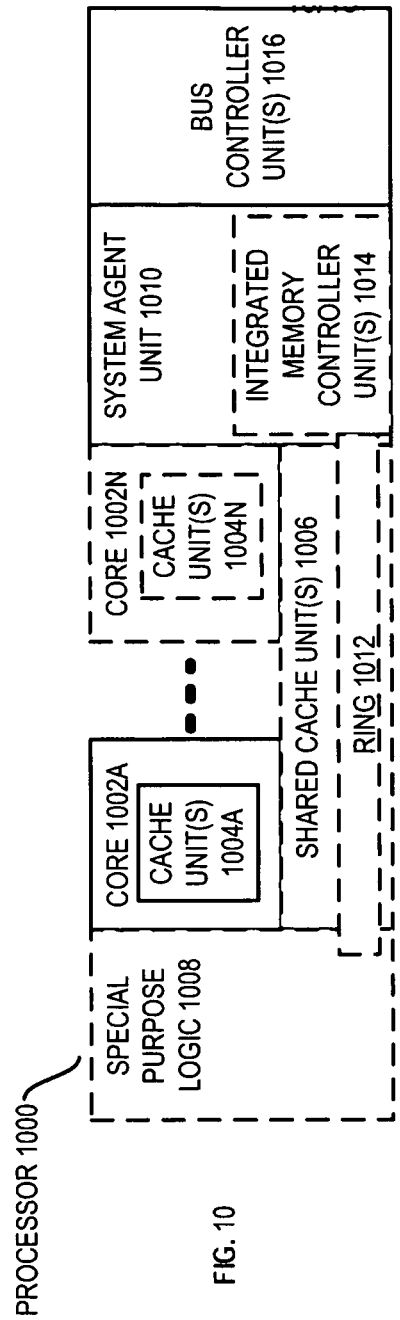
FIG. 10 is a block diagram illustrating a processor that may have more than one core according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 With multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores. 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
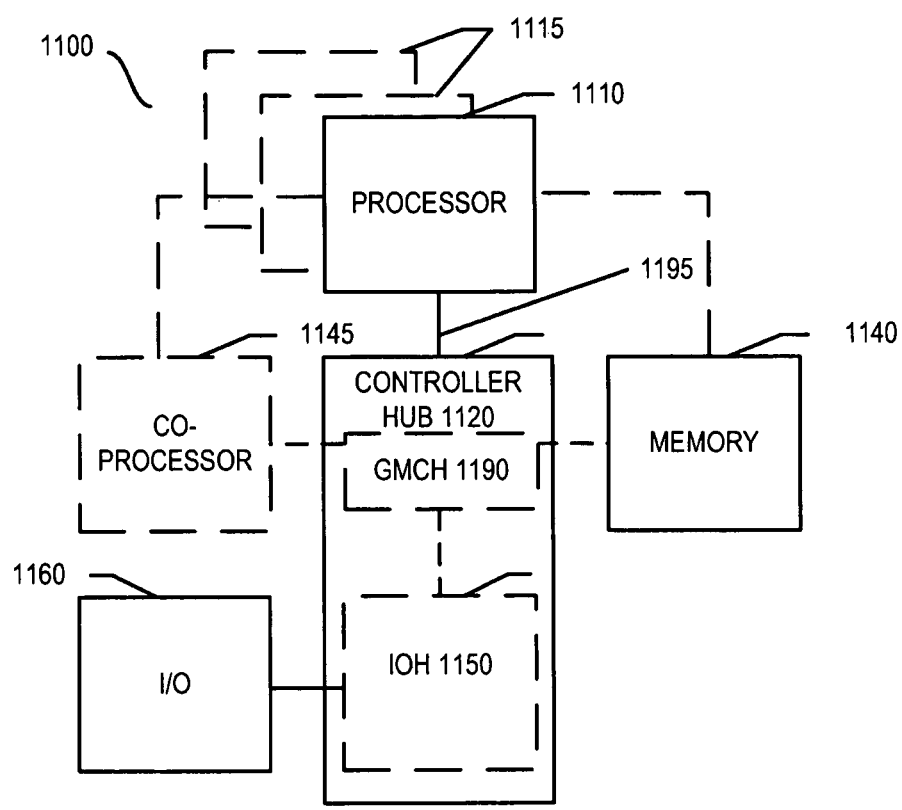
FIG. 11 is a block diagram of a system in accordance with one embodiment of the invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
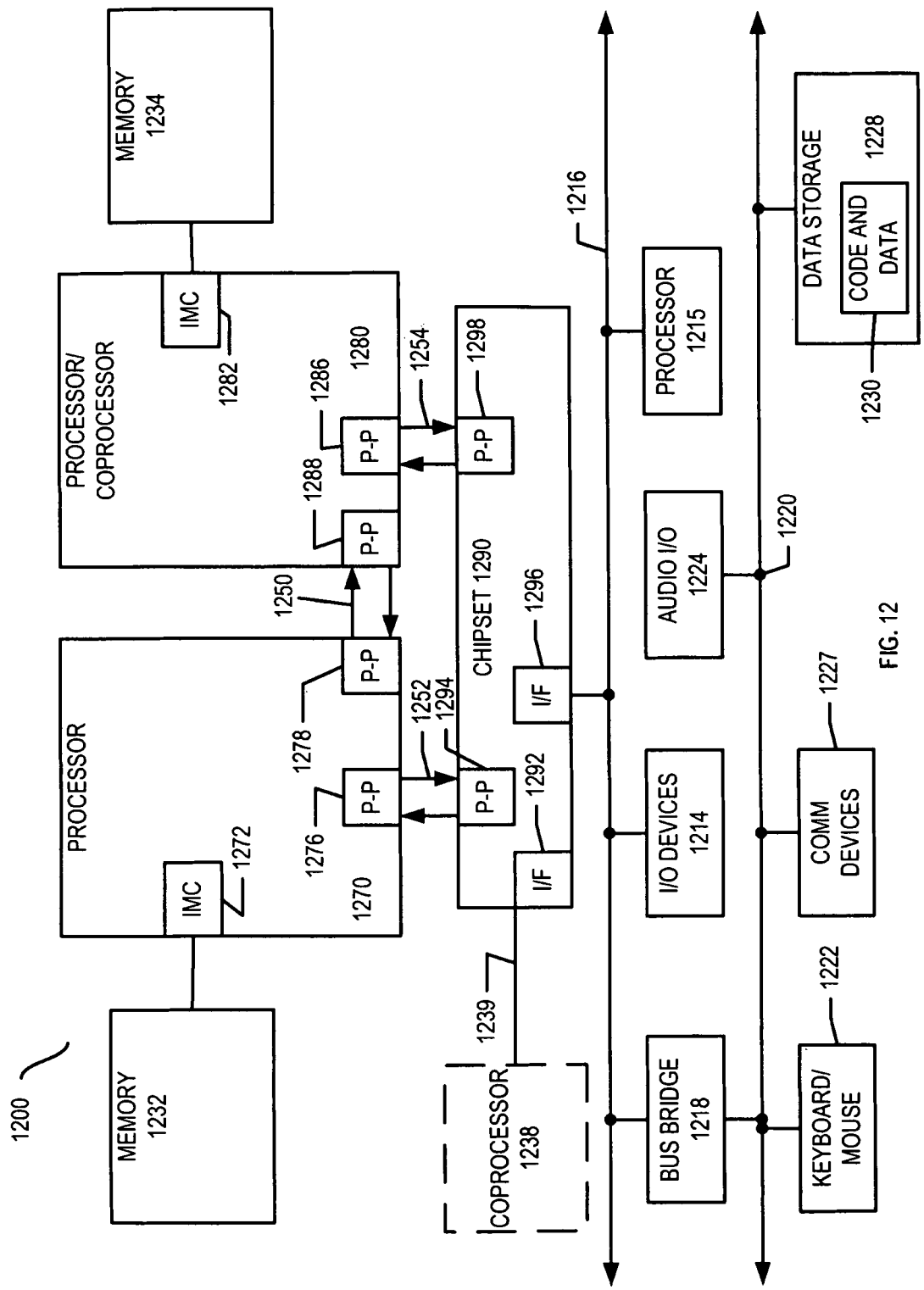
FIG. 12 is a block diagram of a second system in accordance with an embodiment of the invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and I 115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 127.8, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
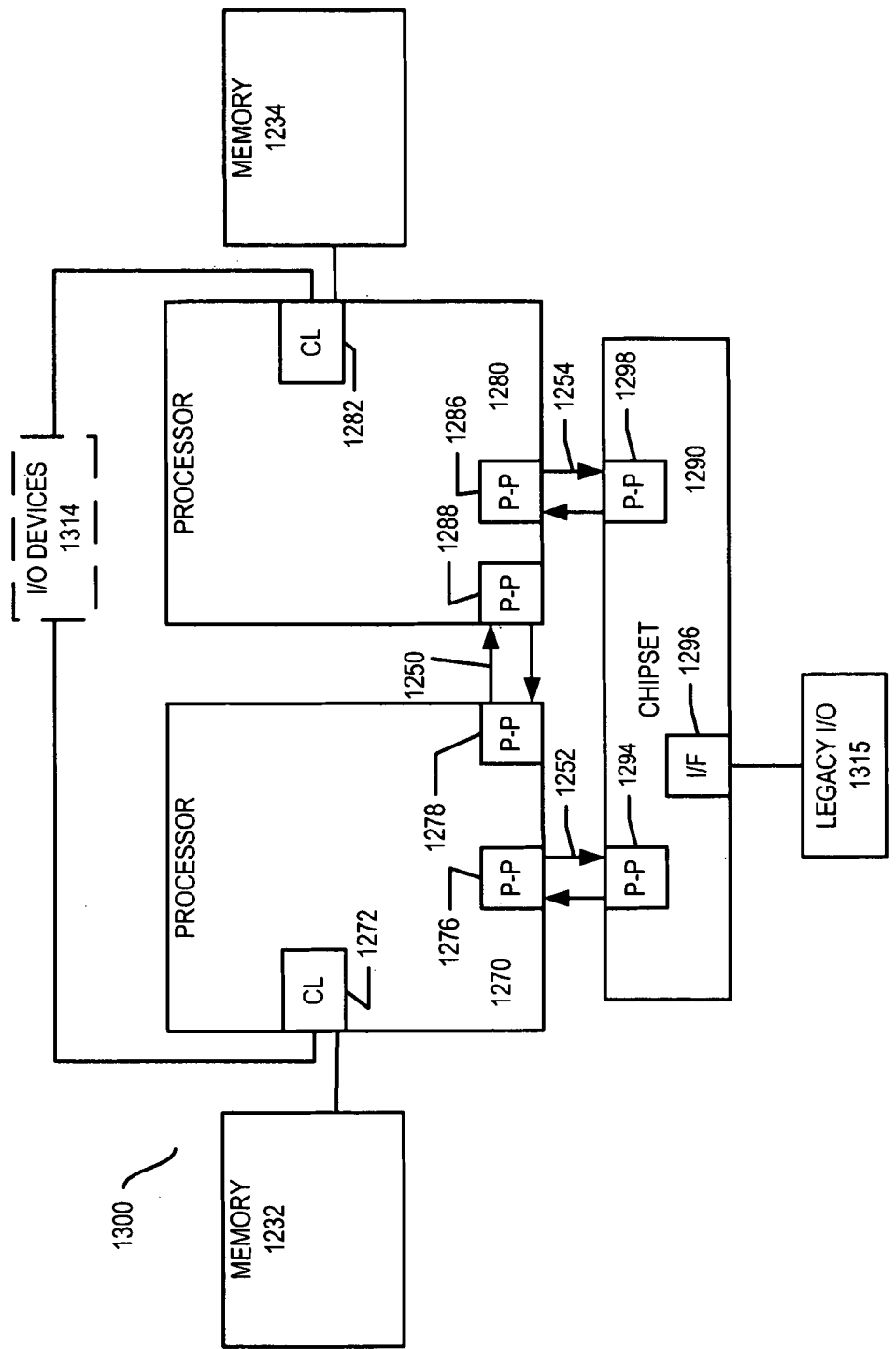
FIG. 13 is a block diagram of a third system in accordance with an embodiment of the invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
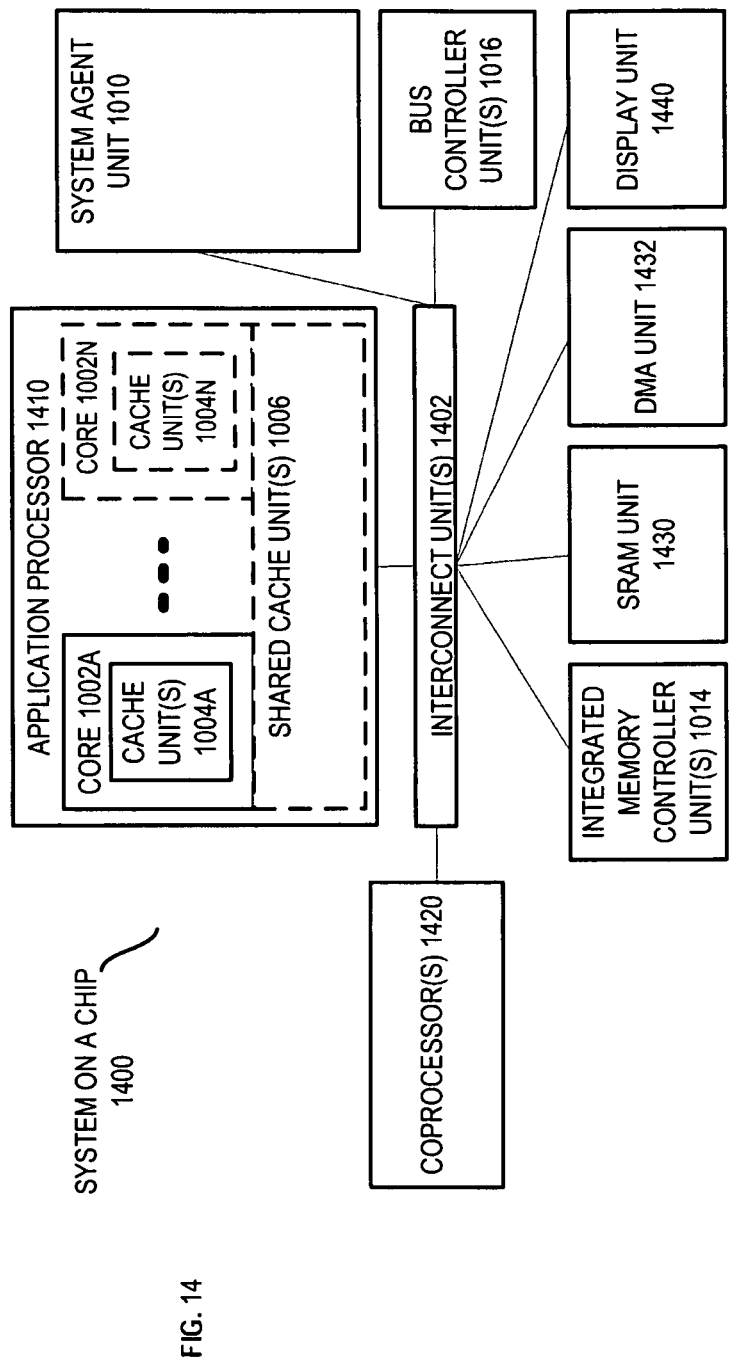
FIG. 14 is a block diagram of a SoC in accordance with an embodiment of the invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
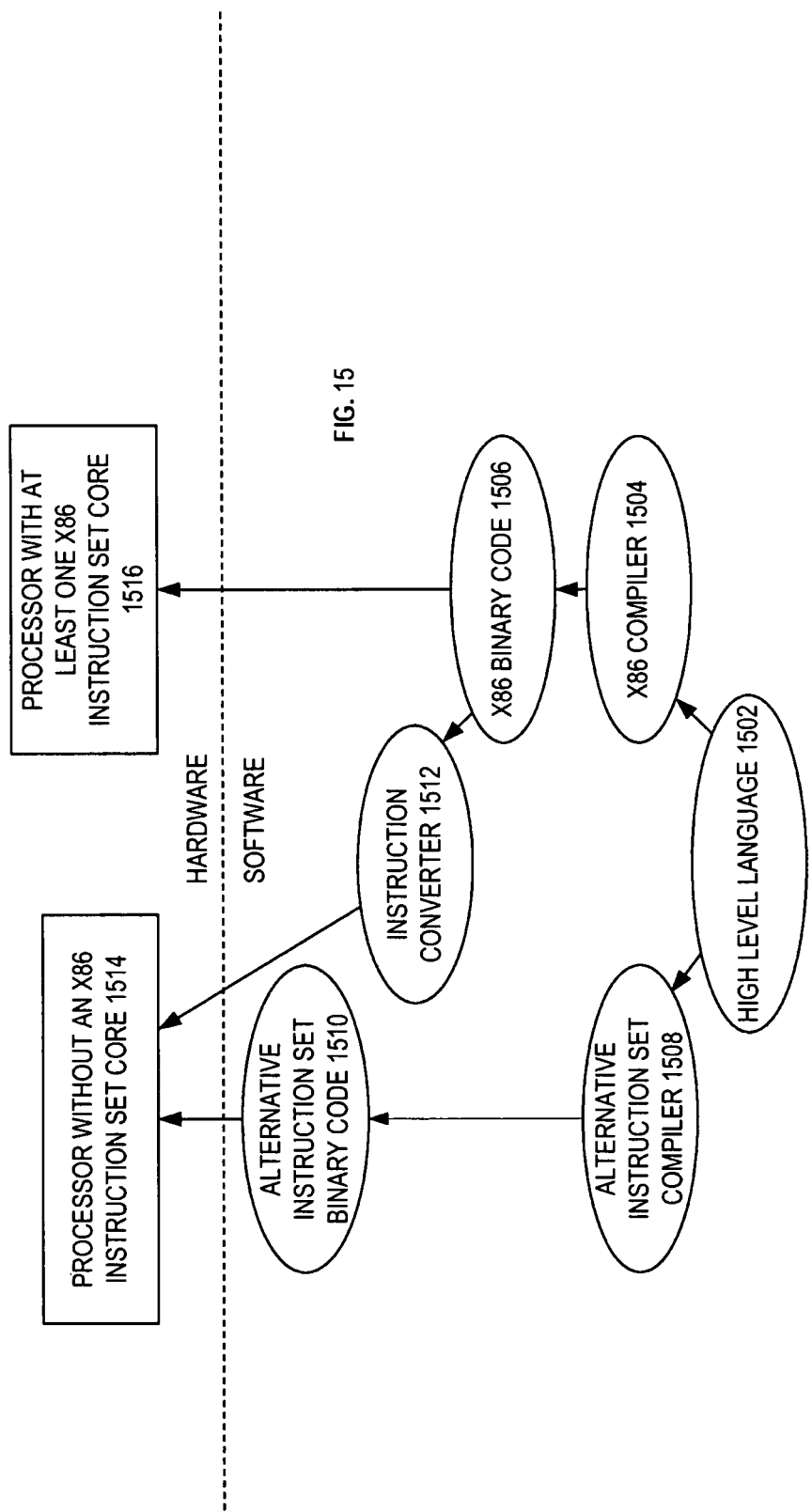
FIG. 15 is a block diagram contrasting the use of a software instruction converter to convert binary instructions in a source instruction set to binary instructions in a target instruction set according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardwire, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor With at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2)

object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Alternative Embodiments

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

What is claimed is:

1. A method of determining that an instruction is allowed to modify a memory region, comprising:
   detecting an indication of an attempt by an instruction to write to a protected memory region of a virtual machine, wherein the protected memory region is in a memory page that is covered by an extended page table and the memory page includes an allowed memory region and an unallowed memory region for the instruction;
   fetching a data length of the instruction from a virtual machine control structure of the virtual machine;
   determining if the instruction is allowed to write to the protected memory region based on a starting address and data length of the instruction; and
   in response to the determining the instruction is allowed to write to the protected memory region, updating the protected memory region with the instruction results.

2. The method of claim 1, wherein the determining comprises:
   determining if the instruction is allowed to write into the starting address; and
   in response to the determining the instruction is allowed to write into the starting address, determining if the instruction is allowed to write into a data range based on the starting address and the data length.

3. The method of claim 1, wherein the protected memory region is read-only memory.

4. The method of claim 1, wherein the indication is an extended page table violation of the protected memory region.

5. The method of claim 1, further comprising: storing the data length in the virtual machine control structure.

6. The method of claim 5, wherein storing the data length comprises:
   detecting the indication prior to a VMEXIT;
   retrieving the data length from the instruction;
   storing the data length in a field in the virtual machine control structure; and
   raising the VMEXIT.

7. The method of claim 1, wherein the virtual machine is a virtual system that is running on a host.

8. A device comprising:
   a detect violation module configured to detect an indication of an attempt by an instruction to write to a protected memory region;
   an access allowed data range module adapted to determine if the instruction is allowed to write to the protected memory region based on a starting address and data length of the instruction, wherein the protected memory region is in a memory page that is covered by an extended page table and the memory page includes an allowed memory region and an unallowed memory region for the instruction;
   a fetch data length module adapted to fetch the data length from a virtual machine control structure; and
   in response to the determining the instruction is allowed to write to the protected memory region, an update module adapted to update the protected memory region with the instruction results.

9. The device of claim 8, wherein the further comprises an access allowed data address module adapted to determine if the instruction is allowed to write into the starting address.

10. The device of claim 8, wherein the protected memory region is read-only memory.

11. The device of claim 10, wherein the memory page includes an allowed memory region and an unallowed memory region for the instruction.

12. The device of claim 8, wherein the protected memory region is in a memory page that is covered by an extended page table.

13. The device of claim 8, wherein the indication is an extended page table violation of the protected memory region.

14. The device of claim 8, wherein the device further comprises a store data length module configured to store the data length in the virtual machine control structure.

15. A non-transitory machine-readable, medium having executable instructions to cause one or more processing units to perform a method to determine that an instruction is allowed to modify a memory region, the method comprising:
   detecting an indication of an attempt by an instruction to write to a protected memory region of a virtual machine, wherein the protected memory region is in a memory page that is covered by an extended page table and the memory page includes an allowed memory region and an unallowed memory region for the instruction;

fetching the data length from a virtual machine control structure of the virtual machine;
determining if the instruction is allowed to write to the protected memory region based on a starting address and data length of the instruction; and
in response to the determining the instruction is allowed to write to the protected memory region, updating the protected memory region with the instruction results.

16. The non-transitory machine-readable medium of claim 15, wherein the determining comprises:
determining if the instruction is allowed to write into the starting address; and
in response to the determining the instruction is allowed to write into the starting address, determining if the instruction is allowed to write into a data range based on the starting address and the data length.

* * * * *